(12) United States Patent
Tokui et al.

(10) Patent No.: US 7,941,456 B2
(45) Date of Patent: May 10, 2011

(54) INFORMATION MANAGEMENT METHOD, INFORMATION MANAGEMENT PROGRAM AND INFORMATION MANAGEMENT APPARATUS

(75) Inventors: Kouichi Tokui, Tokyo (JP); Koshi Yamasaki, Tokyo (JP)

(73) Assignee: Passcell Integration Co., Ltd., Tokyo (JP)

( * ) Notice: Subject to any disclaimer, the term of this patent is extended or adjusted under 35 U.S.C. 154(b) by 87 days.

(21) Appl. No.: 11/658,319

(22) PCT Filed: Jul. 27, 2005

(86) PCT No.: PCT/JP2005/013700
§ 371 (c)(1),
(2), (4) Date: Jan. 24, 2007

(87) PCT Pub. No.: WO2006/011498
PCT Pub. Date: Feb. 2, 2006

(65) Prior Publication Data
US 2008/0109443 A1    May 8, 2008

(30) Foreign Application Priority Data

Jul. 28, 2004 (JP) ............................... P.2004-220160
Aug. 13, 2004 (JP) ............................... P.2004-235768

(51) Int. Cl.
*G06F 17/30* (2006.01)
(52) U.S. Cl. ...................................................... 707/802
(58) Field of Classification Search .................... None
See application file for complete search history.

(56) References Cited

U.S. PATENT DOCUMENTS

| 6,359,622 | B1 * | 3/2002 | Hayes-Roth | 345/474 |
| 2001/0029510 | A1 * | 10/2001 | Tokui | 707/200 |
| 2002/0184610 | A1 * | 12/2002 | Chong et al. | 717/109 |
| 2003/0217047 | A1 * | 11/2003 | Marchisio | 707/3 |

FOREIGN PATENT DOCUMENTS

| JP | 5-127973 | 5/1993 |
| JP | 2001-209641 | 8/2001 |
| JP | 2002-207772 | 7/2002 |
| JP | 2003-178049 | 6/2003 |
| JP | 2004-355506 | 12/2004 |

\* cited by examiner

*Primary Examiner* — Mohammad Ali
*Assistant Examiner* — Syed H Hasan
(74) *Attorney, Agent, or Firm* — Drinker Biddle & Reath LLP

(57) ABSTRACT

A problem of the invention is to provide information management information capable of simply and efficiently updating information to be managed. An information management method of the invention is implemented using a computer on which a predetermined information management program is installed. Information stored in a node unit as information to be managed includes node number, page number, parent node number, node label, node display attribute information, variable information, script for substitution, a script for generation and link information. The script for substitution is a script obtaining a value of self node variable data by performing computation using self node variable data which is variable data included in its node data and upper node variable data which is variable data included in node data of a lineal upper node of its node. A value of a public variable of its node is updated by executing this script.

1 Claim, 14 Drawing Sheets

| NODE NUMBER |
| PAGE NUMBER |
| PARENT NODE NUMBER |
| NODE LABEL |
| NODE DISPLAY ATTRIBUTE INFORMATION |
| VARIABLE INFORMATION |
| SCRIPT FOR SUBSTITUTION |
| SCRIPT FOR GENERATION |
| LINK INFORMATION |

FIG. 1

| NODE NUMBER |
| --- |
| PAGE NUMBER |
| PARENT NODE NUMBER |
| NODE LABEL |
| NODE DISPLAY ATTRIBUTE INFORMATION |
| VARIABLE INFORMATION |
| SCRIPT FOR SUBSTITUTION |
| SCRIPT FOR GENERATION |
| LINK INFORMATION |

FIG. 2

<node nodeNo="3450" ownPageNo="10" belongingPageNo="0" parentNodeNo="0" label=" PASSELL OPERATION MANUAL " x="100" y="100" width="124" height="18" ownX="345" ownY="63" ownWidth="130" ownHeight="28" sideNo="0" decorate="ncolor=-1;fcolor=-16777216;llcolor=-16777216;dir=0;f=10,0;resizable; frameshape=1;icon=40;" line="message=;fcap=0;tcap=3;f=10,0;lcolor=-16777216; color=-4144960;lpos=0;" color="0"><![CDATA[
<DataDivision>
</DataDivision>
<ProcedureDivision></ProcedureDivision>
<GenerateDivision></GenerateDivision>
<LinkageDivision>
</LinkageDivision>
</Node>
]]></node>

FIG. 3

```
<node nodeNo="3526" ownPageNo="3526" belongingPageNo="3484" parentNodeNo=
"3488"label="DECISION STATEMENT" x="311" y="223" width="44" height="18" ownX="94" ownY="228"
 ownWidth="44" ownHeight="18" sideNo="0" decorate="ncolor=-3355393;fcolor=-16777216;
llcolor=-16777216;dir=0;f=10,0;frameshape=0;" line="message=;fcap=0;tcap=3;f=10,0;
lcolor=-16777216;color=-4144960;lpos=0;" color="0"><![CDATA[
<DataDivision>
</DataDivision>
<ProcedureDivision></ProcedureDivision>
<GenerateDivision></GenerateDivision>
<LinkageDivision>
</LinkageDivision>
</Node>
]]></node>
```

FIG. 4

```
<project projectNo="10" name="Manual ver2" createdate="2004/05/01" note="">
```
— 40

`<nodearea>`

```
<node nodeNo="3450" ownPageNo="10" belongingPageNo="0" parentNodeNo="0"
label=" PASSELL OPERATION MANUAL " ····
····</node>
```
— 41a

```
<node nodeNo="3451" ownPageNo="3451" belongingPageNo="10" parentNodeNo
="3450" label="PSL DOCUMENT EDITING" ····
····</node>
```
— 41b

```
<node nodeNo="3479" ownPageNo="0" belongingPageNo="10" parentNodeNo=
"3451" label=" ALL THE PASSELL DATA ARE A STRUCTURED DOCUMENT. 
 A NODE
IS ALSO ONE TEXT UNIT. 
 A USE METHOD OF INTERNAL DATA OR A FORMAT OF A
SCRIPT IS DESCRIBED HEREIN. " ····
····</node>
```
— 41c

```
<node nodeNo="3623" ownPageNo="3623" belongingPageNo="10" parentNodeNo
="3450" label=" OPERATION OF PSL OBJECT "····
····</node>
```
— 41d — 41e

⋮

— 41n

`</nodearea>`
`<linearea>`

```
<line lineNo="1" fromNodeNo="3502" toNodeNo="3503" PageNo="3489" decorate
="fcap=0;tcap=3;f=10,0; ···· Target="" Parameter="" Message="" Options="" />
····
····
····
```
— 42

`</linearea>`
`<reportarea>`

```
<report reportNo="2" nodeNo="3833" title="hello" contents="aaa" createDate=
"2004/06/23" />
····
```
— 43

`</project>`

FIG. 9

```
<node nodeNo="158643" ownPageNo="0" belongingPageNo="20" parentNodeNo=
"123282" label=" MW70 BASEBOARD (FRONT) "...
...
<DataDivision>
<Variable name="_x" value="930.0" />
<Variable name="_y" value="0.0" />
<Variable name="_w" value="800.0" />
<Variable name="_h" value="75.0" />
...
<Variable name=" THE NUMBER OF SLICES " value="" needcalc="" />
<Variable name=" COLOR " value="" needcalc="" />
....
<Variable name="_unfixed" value="false" private="" />
<Variable name="_slicetype" value=" BASEBOARD " private="" />
<Variable name="_sliceweight" value="0.0" private="" />
...
</DataDivision>
<ProcedureDivision>
THE NUMBER OF SLICES = THE NUMBER OF SAME SURFACES;
COLOR = BASEBOARD COLOR;
...
</ProcedureDivision>
<GenerateDivision>
if (_w>1400){
   if (BASEBOARD MATERIAL==" STEEL"){
      use("C07000400000000004",1) ;
      use("C07000400000000005",1) ;
   } else if ( BASEBOARD MATERIAL==" STAINLESS STEEL"){
      use("C07000400000000006",1) ;
      use("C07000400000000007",1) ;
   }
} else {
   if (BASEBOARD MATERIAL==" STEEL"){
      use("C07000400000000001",1) ;          // BASEBOARD(ST)
   } else if (BASEBOARD MATERIAL==" STAINLESS STEEL" ){
      use("C07000400000000002",1) ;          // BASEBOARD(SUS)
   }
}
...
</GenerateDivision>
<LinkageDivision>
</LinkageDivision>
</Node>
]]></node>
```

FIG. 10

| | VARIABLE NAME | VALUE | QUALIFICATION |
|---|---|---|---|
| 51 | _x | 930.0 | NONE |
| | _y | 0.0 | NONE |
| | _w | 800.0 | NONE |
| | _h | 75.0 | NONE |
| | ... | ... | ... |
| | THE NUMBER OF SLICES | | NEED FOR CALCULATION |
| | COLOR | | NEED FOR CALCULATION |
| | BASEBOARD MATERIAL | STEEL | NONE |
| | ... | | |
| 52 | _layername | fore | NONE |
| | SURFACE NO | 1 | NONE |
| | SURFACE ID | MW | NONE |
| | THE NUMBER OF SAME SURFACES | 1 | NONE |
| | ... | | |
| | PANEL COLOR | KW-400 | NONE |
| | BASEBOARD COLOR | F-205 | NONE |
| | ... | | |
| | DATE OF REGISTRATION | 200310 | NONE |
| | PRODUCTION NUMBER | 000000990070 | NONE |
| | ... | | |

FIG. 11

| VARIABLE NAME | VALUE |
|---|---|
| ... | |
| _unfixed" value | false |
| _slicetype | BASEBOARD |
| _sliceweight | 0.0 |
| ... | |

FIG. 13

| VARIABLE NAME | VALUE | QUALIFICATION |
|---|---|---|
| _x | 930.0 | NONE |
| _y | 0.0 | NONE |
| _w | 800.0 | NONE |
| _h | 75.0 | NONE |
| ... | ... | ... |
| THE NUMBER OF SLICES | 1 | NEED FOR CALCULATION |
| COLOR | F-205 | NEED FOR CALCULATION |
| BASEBOARD MATERIAL | STEEL | NONE |
| ... | | |
| _layername | fore | NONE |
| SURFACE NO | 1 | NONE |
| SURFACE ID | MW | NONE |
| THE NUMBER OF SAME SURFACES | 1 | NONE |
| ... | | |
| PANEL COLOR | KW-400 | NONE |
| BASEBOARD COLOR | F-205 | NONE |
| ... | | |
| DATE OF REGISTRATION | 200310 | NONE |
| PRODUCTION NUMBER | 000000990070 | NONE |
| ... | | |

51 { (rows from _x through BASEBOARD MATERIAL)
52 { (rows from _layername through PRODUCTION NUMBER)

FIG. 14

```
<Node nodeno="71980" name="BASEBOARD(ST)" x="378" y="478" width="53" height="18"
decorate="ncolor=-3342388;fcolor=-16777216;llcolor=-
16777216;dir=0;f=10,0;frameshape=0;"
linedetail="message=;fcap=0;tcap=3;f=10,0;lcolor=-16777216;color=-4144960;">
<DataDivision>
<Variable name=" SURFACE NUMBER  " value="" needcalc="" />
<Variable name="    SPAN NUMBER     " value="" needcalc="" />
<Variable name=" SURFACE TREATMENT " value="" needcalc="" />
<Variable name="H" value="" needcalc="" />
<Variable name=" EXPANSION WIDTH  " value="" needcalc="" />
<Variable name="     FINISH L     " value="" needcalc="" />
<Variable name=" BOARD THICKNESS" value="0.8" />
<Variable name="     QUANTITY     " value="1" needcalc="" />
<Variable name="_diccode" value="C07000400000000001" private="" />
<Variable name="PI" value="18700000" private="" />
<Variable name="   NAME   " value="BASEBOARD (ST)" private="" />
...
</DataDivision>
<ProcedureDivision>
SURFACE NUMBER = SURFACE NO;
SPAN NUMBER= _hpos;
SURFACE TREATMENT = COLOR
H= _h + _topex + _bottomex - BASEBOARD BOTTOM CLEARANCE;
EXPANSION WIDTH = H+15.5;
QUANTITY = THE NUMBER OF SLICES;
...
</ProcedureDivision>
<GenerateDivision>
</GenerateDivision>
<LinkageDivision>
</LinkageDivision>
</Node>
```

FIG. 15

```
<node nodeNo="158829" ownPageNo="0" belongingPageNo="20"
parentNodeNo="158643" label="BASEBOARD(ST)" ...
...
<DataDivision>
<Variable name=" SURFACE NUMBER " value="1" needcalc="" />
<Variable name="   SPAN NUMBER   " value="2" needcalc="" />
<Variable name=" SURFACE TREATMENT " value="F-205" needcalc="" />
<Variable name="H" value="65" needcalc="" />
<Variable name=" EXPANSION WIDTH " value="80.5" needcalc="" />
<Variable name="     FINISH L    " value="1200" needcalc="" />
<Variable name="BOARD THICKNESS " value="0.8" />
<Variable name="   QUANTITY    " value="1" needcalc="" />
<Variable name="_diccode" value="C07000400000000001" private="" />
<Variable name="PI" value="18700000" private="" />
<Variable name="NAME" value=" BASEBOARD (ST)" private="" />
...
</DataDivision>
<ProcedureDivision>
SURFACE NUMBER = SURFACE NO;
SPAN NUMBER= _hpos;
SURFACE TREATMENT = COLOR
H= _h + _topex + _bottomex - BASEBOARD BOTTOM CLEARANCE;
EXPANSION WIDTH = H+15.5;
QUANTITY = THE NUMBER OF SLICES;
...
</ProcedureDivision>
<GenerateDivision>
</GenerateDivision>
<LinkageDivision>
</LinkageDivision>
</Node>
]]></node>
```

INFORMATION MANAGEMENT METHOD, INFORMATION MANAGEMENT PROGRAM AND INFORMATION MANAGEMENT APPARATUS

TECHNICAL FIELD

The present invention relates to an information management method, an information management program and an information management apparatus for managing information using a computer.

RELATED ART

In the case of managing various information using a computer, the information is generally managed by keeping files (a document file, an image file, etc.) in which each of the information is stored in predetermined folders. However, a structure of the created folder and a kind etc. of file kept in each of the folders are arbitrary and depend on a creator of the folder, so that it is not necessarily easy for a person other than the creator to properly access the necessary information. That is, it is not easy to manage the information so that many persons can share and reuse the information.

A document information management system capable of efficiently implementing sharing and reuse of information is described in Patent Reference 1. This document information management system is a system in which a tree is created and displayed every matter (project) and a created document file is attached to any node of the displayed tree and is kept in a server computer.

Also, there are structured document standards such as XML (Extensible Markup Language) as a data format capable of being handled in common by different computers or applications, and a structured document processing system in which such a structured document is grasped as a tree structure and is processed is described in Patent Reference 2.

However, efficiency of updating of various information managed is not achieved sufficiently in the management system described above. That is, information included in nodes of a tree structure is often related mutually, but the management system needs to individually update corresponding portions of respective documents and does not have sufficient efficiency.

Patent Reference 1: JP-A-2002-207772
Patent Reference 2: JP-A-2003-178049

DISCLOSURE OF THE INVENTION

Problems that the Invention is to Solve

The invention has been implemented in view of the circumstances described above, and an object of the invention is to provide information management information capable of simply and efficiently updating information to be managed.

Means for Solving the Problems

An information management method of the invention is an information management method in which a computer manages information, and comprises an information storage step in which the computer stores information which is to be managed and is inputted to the computer with the information associated with each of the plural nodes as a document file including plural node data associated with node identification information for identifying the nodes, an information display step in which the computer displays information about the document file stored in the information storage step, and an information evaluation step in which the computer executes a script included in the node data, wherein the node data includes parent node identification information for pinpointing a parent node of the node excluding a root node, and the script includes a script for substitution for obtaining a value of self node variable data by performing computation using self node variable data which is variable data included in the node data and upper node variable data which is variable data included in node data of a lineal upper node of the node, and the information display step includes a tree structure display step of displaying a tree structure of the node using the parent node identification information, and a node data table display step of displaying the script, the upper node variable data and self node variable data of a node selected from among nodes of the displayed tree structure, and the information evaluation step includes a step of updating a value of self node variable data by execution of the script for substitution.

According to the invention, node data can be updated using a script included in data inputted by a user, so that information to be managed can be updated simply and efficiently. Also, information about individual businesses or matters is managed using one document data including plural node data, so that sharing and reuse of information by many users can be made simply and efficiently and also based on the document data, a tree structure of a node can be displayed simply and all the businesses or matters can be grasped simply. Further, detailed information associated with individual nodes of the displayed tree structure can be displayed simply.

The information management method of the invention includes a method in which the tree structure display step includes display of a node label indicating the node and a hierarchical lead for making connection to the node label of the parent node. According to the invention, a hierarchical relation between nodes can be identified easily.

The information management method of the invention includes a method in which in the case of executing the script for substitution of a node selected from among nodes of the displayed tree structure, the information evaluation step together executes the script for substitution of a lineal lower node of the selected node. According to the invention, related nodes can be evaluated simultaneously. Also, a variable value of a lower node at the time of changing a variable value of an upper node can be outputted simply, so that a simulation action can be performed simply.

The information management method of the invention includes a method in which the script includes a script for generation for newly generating a lineal lower node, and the script for generation newly generates the node using a node group of a tree structure or a node registered previously. According to the invention, new creation of a similar node can be performed simply. Therefore, a node of a child component whose size varies by a size of a parent component can be created simply in the case of being applied to component management.

The information management method of the invention includes a method in which the node data of the root node includes own page number for identifying a page formed by the root node, and the node data of a node excluding the root node can include own page number for identifying own page formed by the node while including a belong page number for identifying a belonging page to which the node belongs, and the tree structure display step can display a tree structure in which the node having own page number is set at the head on a different page while displaying a tree structure in which the root node is set at the head based on the belong page number and own page number. According to the invention, a large tree structure can also be displayed efficiently and the whole configuration of information to be managed can be grasped easily. Also, another tree structure can be created from a particular node, so that a tree structure of another standpoint can be created simply and it becomes easy to arrange the information to be managed.

The information management method of the invention includes a method in which in the case of displaying a node other than the root node having own page number, the tree structure display step distinguishably displays the node and the node without own page number. According to the invention, a node forming the head of a tree structure of another page can be identified simply, so that transition of a page to be displayed can be made easily.

The information management method of the invention includes a method in which the node data table display step includes a public variable also used in the script of a lineal lower node of the node and a limit variable only used in the script of the node. According to the invention, only the necessary variable data can be inherited to a lower node.

The information management method of the invention includes a method in which in the case of display of the public variable, the node data table display step displays self node variable data and the upper node variable data in a form capable of distinguishing and recognizing the variable data. According to the invention, creation of a script, check and input of a variable of self node can be performed easily.

The information management method of the invention includes a method in which the document stored in the information storage step includes reference information indicating a relation between a reference destination node and a reference source node inputted to the computer, and the script for substitution of the reference source node is means for obtaining a value of self node variable data by performing computation using variable data of the reference destination node pinpointed by the reference information in addition to self node variable data and the upper node variable data. According to the invention, variable data of the reference destination node can be used as a primary variable, and a computation function of the script for substitution can be expanded.

The information management method of the invention includes a method in which the tree structure display step is a step of selectively displaying a lead for making connection between the reference destination node and the reference source node. According to the invention, the reference destination node and the presence or absence of a reference destination can be checked simply.

The information management method of the invention includes a method in which the node data table display step is a step of together displaying variable data of the reference destination node. According to the invention, variable data used in a script for substitution can be checked surely and it becomes easy to check and create the script for substitution.

The information management method of the invention includes a method in which the information input step can input information for describing the node, and the information storage step stores information for describing the node with the information associated with the node as a node report, and the information display step includes a report display step of displaying the node report of a node selected from among nodes of the displayed tree structure. According to the invention, various information as well as variable data can be managed efficiently with the information and data associated with a node.

The information management method of the invention includes a method in which the information input step can input link information indicating a storage place of information related to the node, and the information storage step stores the link information with the link information included in the node data, and the information display step includes a link information display step of displaying information related to the node with reference to the link information about a node selected from among nodes of the displayed tree structure. According to the invention, information other than information stored inside a document can be associated with a node and be referred to.

An information management program of the invention is an information management program for making a computer execute each of the steps in the information management method described above.

An information management apparatus of the invention is an apparatus including a computer on which the information management program described above is installed.

EFFECT OF THE INVENTION

As is evident from the above description, according to the invention, information to be managed can be updated simply and efficiently.

BRIEF DESCRIPTION OF THE DRAWINGS

FIG. 1 is a diagram showing one example of information capable of being stored as node data in an information management method of the invention.

FIG. 2 is a diagram showing one example of node data in the information management method of the invention.

FIG. 3 is a diagram showing another example of node data in the information management method of the invention.

FIG. 4 is a diagram showing one example of document information stored in the information management method of the invention

FIG. 9 is a diagram showing a part of node data of a node showing one component of the case of being applied to component management of the information management method of the invention.

FIG. 10 is a diagram showing a display example of public variables of the case of selecting one component of the case of being applied to component management of the information management method of the invention.

FIG. 11 is a diagram showing a display example of limit variables of the case of selecting one component of the case of being applied to component management of the information management method of the invention.

FIG. 13 is a diagram showing a display example after evaluation by a script for substitution of public variables of the case of selecting one component of the case of being applied to component management of the information management method of the invention.

FIG. 14 is a diagram showing a part of node data of a dictionary node in the information management method of the invention.

FIG. 15 is a diagram showing a part of node data of a node generated by execution of a script for generation in the information management method of the invention.

DESCRIPTION OF REFERENCE NUMERALS AND SIGNS

Figure 5:
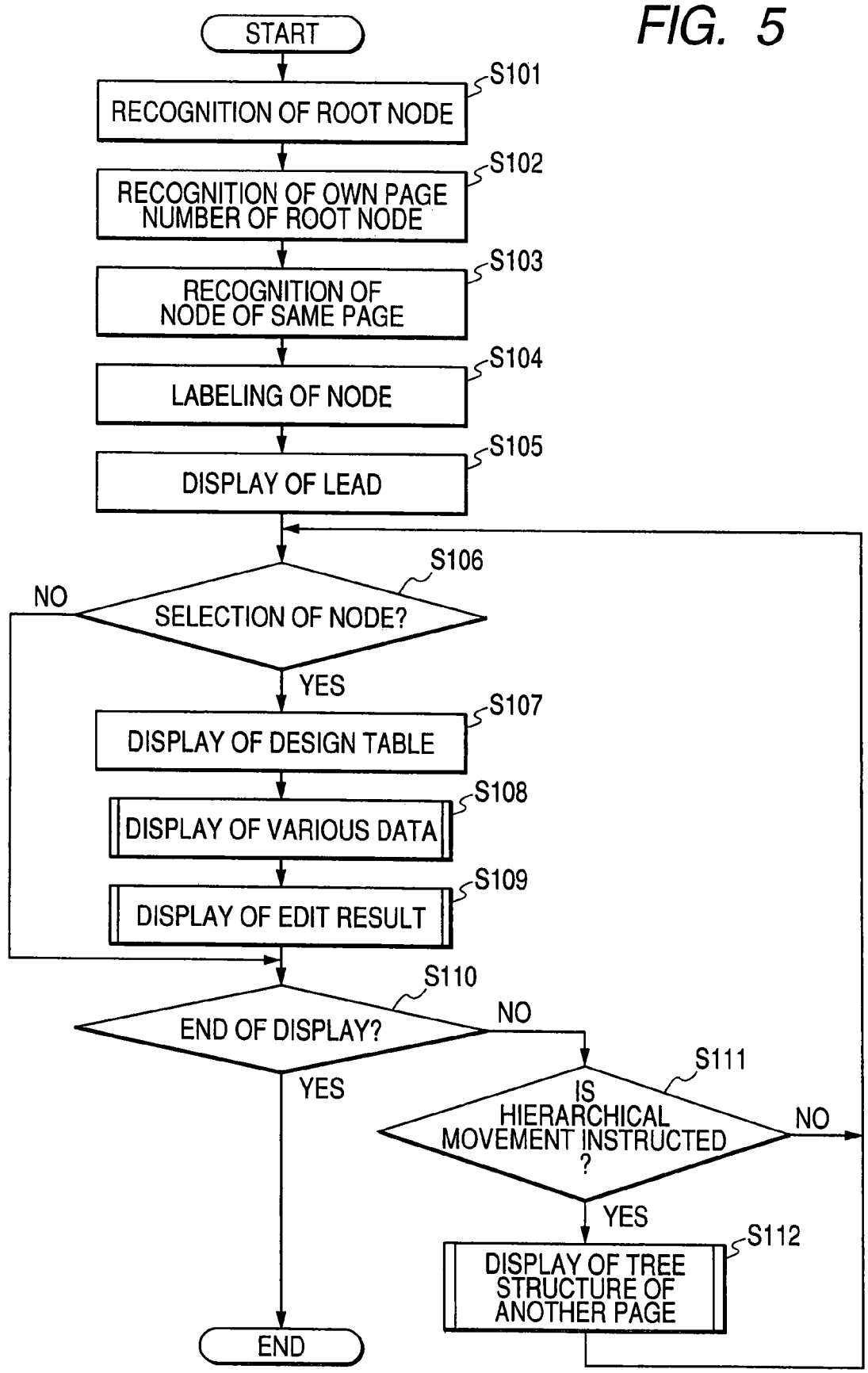
FIG. 5 is a diagram showing a schematic action flow of the case of displaying document information in the information management method of the invention.

10 . . . TREE VIEWER
11a,11b,11c,11d . . . LABELING
12b,12c,12d . . . HIERARCHICAL LEAD
13a . . . ROOT NODE DISPLAY MARK
14b,14d . . . HIERARCHICAL MOVEMENT MARK
20 . . . DESIGN TABLE
21 . . . PUBLIC VARIABLE DISPLAY AREA
22 . . . LIMIT VARIABLE DISPLAY AREA
23 . . . DISPLAY AREA OF SCRIPT FOR SUBSTITUTION
24 . . . DISPLAY AREA OF SCRIPT FOR GENERATION
20a,21a,22a . . . OPERATION BUTTON DISPLAY AREA
40 . . . HEADER PART
41a~41n . . . NODE DATA PART
42 . . . LINE PART
43 . . . REPORT PART
51 . . . PUBLIC VARIABLE OF SELF NODE
52 . . . PUBLIC VARIABLE OF LINEAL UPPER NODE
42 . . . LINE PART
43 . . . REPORT PART

BEST MODE FOR CARRYING OUT THE INVENTION

An embodiment of the invention will be described below using the drawings.

An information management method and an information management apparatus of the invention are implemented using a computer on which a predetermined information management program is installed. The computer used herein may be a computer of a stand-alone type or a client-server type.

The information management program installed on the computer includes a program for executing an information input step of inputting information to be managed with the information associated with nodes, an information storage step of storing data inputted in the information input step as a document including plural node data associated with node identification information for identifying each of the nodes, an information display step of displaying information about the document stored in the information storage step, and an information evaluation step of executing a script included in the node data.

FIG. 1 shows one example of information stored as node data. The stored information includes a node number, a page number, a parent node number, a node label, node display attribute information, variable information, a script for substitution, a script for generation and link information.

The node number is information for identifying a node, and a unique number is automatically assigned to the node number at the time of generating a node. The page number is a number for displaying a node included in a document as plural tree structures, and includes own page number for identifying the page when the node forms another page in a belong page number for identifying the page to which the node belongs. Therefore, the node in which both the page numbers are stored belongs to two pages. The parent node number is a number for identifying a parent node of its node and by specifying a parent node at the time of generating a node, a node number of the specified parent node is automatically stored.

The node label is information indicating its node at the time of displaying a tree structure, and any information such as a node name can be stored. The node display attribute information is information for specifying frame attributes such as a size or a shape of a frame, character attributes such as a font, a color of a character, a background at the time of displaying a node. When a JPG image etc. wish to be displayed in a node herein, a URL etc. for specifying a place of its image file are stored.

The variable information is data held by each node, and is associated with a variable name and is stored. The stored variable includes a public variable referred to from a lower node and a limit variable only used within self node. Also, in a value (may be described as "variable data") of a variable, a fixed value may be set or a value computed by execution of a script may be set. Also, a URL may be set. What value is set is arbitrary.

The script for substitution is a script for computing a value of a variable of self node. The script for substitution can be described using self node variable data which is a value of a variable of self node and upper node variable data which is a value of a public variable of a lineal upper node of its node.

The script for generation is a script for using a node group (plural nodes of a tree structure) or other nodes registered in a dictionary and newly generating a lower node of its node. By using the script for generation in combination with a conditional statement, a child node or a grandchild node can be generated by a result of variable data obtained by execution of the script for substitution. By using the script for generation, data of a child component of the case of changing the child component by a size of a parent component can simply be generated, for example, when component management is performed.

In addition, any language used as a script language can be used as a language used in the script for substitution and the script for generation.

The link information is information about a file linked to each node. In the case of being implemented by a computer of a stand-alone type, this information is index information about a link file. Also, in the case of being implemented by a computer of a client-server type, after a link file is transferred to a server, index information is created and stored. By storing the link information, each node can be used as a folder.

The node data is stored as, for example, tagged document information. FIG. 2 shows one example of node data. Data of FIG. 2 is an example of node data of a root node, and a node number (nodeNo) is "3450" and own page number (ownPageNo) is "10" and a node label (label) is "Passell operation manual". The fact that (belongPageNo) indicating a belong page number is "0" and (parentNodeNo) indicating a parent node number is "0" indicates that it is a root node. A range from "x="100"" to "color="0"" of FIG. 2 is node display attribute information about a display position etc. of a node.

In this format, variable information is inserted between "<DataDivision>" and "</DataDivision>", and a script for substitution is inserted between "<ProcesureDivision>" and "</ProcesureDivision>", and a script for generation is inserted between "<GenerateDivision>" and "</GenerateDivision>", and link information is inserted between "<LinkageDivision>" and "</LinkageDivision>". However, in the example of FIG. 2, the variable information, the script for substitution and the script for generation are not stored.

FIG. 3 shows another example of node data. Data of FIG. 3 is an example of node data other than a root node. A belong page number is "3484" and a parent node number is "3488" and it can grasp that the data is node data of a node other than a root node. Also, it can grasp that the data is the head node of a tree structure of another page since own page number is "3526".

FIG. 4 shows one example of storing data to be managed as document information including plural node data. A document of FIG. 4 comprises a header part 40, node data parts 41a to 41n, a line part 42 and a report part 43.

The header part 40 includes information indicating a project number, a name (project name), etc. of a project referring to a matter etc. managed. The example of FIG. 4 indicates that the project name is "Manual ver2" and the project number is "10".

The node data part 41a shows node data of a root node, and the node data parts 41b to 41n are node data of nodes other than the root node.

The line part 42 is an area in which information for defining a lead for making connection between nodes is stored. The lead for making connection between nodes includes a hierarchical lead for making connection between a parent node and a child node and a reference lead for making connection between a reference destination node and a reference source node temporarily referring to a variable regardless of a hierarchical relation, and the line part 42 defines a display attribute, a position and presence, etc. of the reference lead.

Next, display of document information stored will be described. FIG. 5 shows a schematic action flow of the case of displaying document information, and FIG. 6 shows an example of a display screen of the case of displaying the document shown in FIG. 4.

Figure 6:
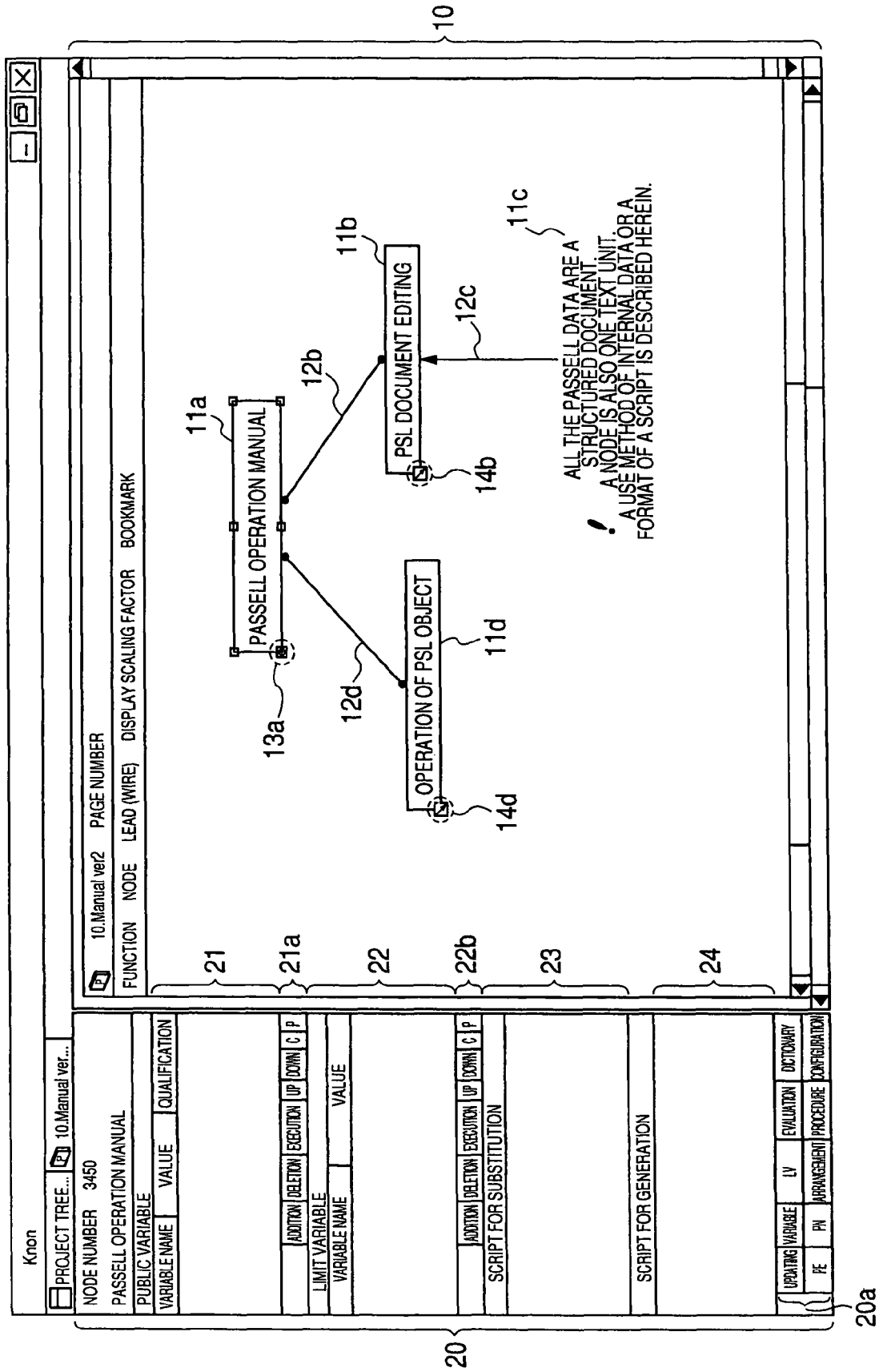
FIG. 6 is a diagram showing an example of a display screen of document information in the information management method of the invention.

The display screen of FIG. 6 has a tree viewer 10 and a design table 20. The tree viewer 10 is an area in which a tree structure of nodes is displayed, and is also used as an area in which a pop-up menu and a pull-down menu for performing various operations at the time of managing nodes are displayed. The tree structure of nodes is displayed by display of a lead and a label and in the example of FIG. 6, labeling 11a of a root node, labelings 11b, 11c, 11d of nodes other than the root node, and hierarchical leads 12b, 12c, 12d for making connection between their labelings are displayed.

The labelings 11a to 11d are displayed based on node display attribute information, and a mark 13a indicating that it is a root node is added to the labeling 11a of the root node. Also, marks 14b, 14d indicating that effect are added to nodes having own page numbers in nodes other than the root node. It can simply recognize that a tree structure of another page is present by adding the marks 14b, 14d.

The design table 20 is an area in which information had by a node selected from among nodes displayed on the tree viewer 10 is displayed, and has a public variable display area 21, a limit variable display area 22, a display area 23 of a script for substitution, a display area 24 of a script for generation and operation button display areas 21a, 22a, 20a. Each of the operation buttons of the operation button display area 21a is means for performing various operations with respect to a public variable, and each of the operation buttons of the operation button display area 22a is means for performing various operations with respect to a limit variable. Also, each of the operation buttons of the operation button display area 20a is means for performing various operations with respect to the design table 20.

When a document file created every project is selected and opened, display processing is performed by a procedure shown in FIG. 5. In step S101, a root node is recognized from document data. As described previously, in node data of the root node, a belong page number and a parent page number are "0", so that the root node can be recognized by seeking such a node. In addition, when a document number is uniquely allocated and own page number of the root node is matched with the document number, it becomes easier to recognize the root node.

In step S102, own node number of the recognized root node is recognized and in step S103, a node belonging to a page of the recognized page number is recognized. That is, a node having own page number of the root node as a belong page number is recognized.

Then, the node recognized in step S103 is labeled (step S104). The labeling is displayed based on node display attribute information and a node label of its node. Then, a hierarchical lead is displayed based on a parent-child relation of the displayed node and further a reference lead is displayed with reference to information about the line part 42 of a document (step S105).

This state is a state of displaying a tree structure on the tree viewer 10. In step S106, it is determined whether or not a node displayed on the tree viewer 10 is selected, and when the node is selected, the design table 20 is displayed (step S107) and a variable, a script, etc. of its node are displayed (step S108). FIG. 6 is an example of the case of selecting the root node, and variable information etc. are not stored in the root node, so that there is no display of data on the design table 20. When another node is selected in this state, a variable etc. of its node are displayed.

When a value of a variable stored is a URL or a file path, the contents of the URL or the file path are displayed by pushing "execution" buttons of the areas 21a, 22a in a state of selecting its variable.

The design table 20 is displayed by selecting a node, and a node report and link information about each node are displayed by displaying a menu after the node is selected. When display of the link information is instructed, a list of the link information about node data of its node is displayed by another window. When the link information is not stored, the list is a blank field. When a file in the displayed list is selected, information according to the contents of its file is displayed. When display of the node report is instructed, the node report is displayed in another window and also a report area 43 is referred to and when information about the corresponding node is stored, its information is displayed in another window displayed.

The node report and the link information about the node can be added and deleted in a state of displaying a report display window or a list of the link information.

In a state shown in FIG. 6, node data and a tree structure displayed can be edited and display corresponding to an edit operation is performed (step S109). A node label change, a display attribute change, display position movement, deletion, addition, etc. of a node are made on the tree viewer 10 by setting of a pop-up menu and a pull-down menu. For example, a display position is changed by dragging the labeling, and a node label and a display attribute are changed by displaying a window for change. Also, a node is deleted by displaying a menu in a state of selecting a node which one wishes to delete. In the addition of a node, a new node is generated by being set in an addition mode with a menu and then selecting a parent node of a node which one wishes to add and dragging as it is. Also, a node is reconnected by selecting a node which one wishes to reconnect and displaying a menu and selecting "node reconnection" and selecting a node (a node which one wishes to set in a parent node) of a connection destination which one wishes to change. Display attribute information and a node label of a node generated are set by displaying a window for modification.

Since data on each node is in a batch as node data, even when these data are edited, it could be only reflected on the node data of the edited node and the edit work can be done at a light processing load.

In the case of adding and modifying information about the design table, the information is added and modified by pushing the corresponding buttons of the areas 21a, 22a, 20a. In the addition of a variable, an "addition" button of the area 21a or 22a is pushed and a new variable is generated and information about qualification, a value and a variable name is inputted. The variable may be inputted by displaying an input form in another window.

A script for substitution and a script for generation are created using variables displayed in the public variable area 21 and the limit variable area 22. Public variables of all the lineal upper nodes as well as a public variable of self node are displayed in the public variable area 21. In the case of wishing to refer to a variable of a node other than the lineal upper nodes, a reference lead is generated and is associated with a node of a reference destination. The script for substitution and the script for generation may be directly inputted to the area 23 of the script for substitution and the area 24 of the script for generation or may be inputted by opening another window.

In addition, the contents of editing of the design table 20 are reflected on document information by pushing an updating button of the area 20a.

Subsequently, it is determined whether or not the end of display, that is, document closing is instructed in step S110, and when the end of display is not instructed, it is determined whether or not hierarchical movement is instructed (step S111). The hierarchical movement is instructed from a pop-up menu in a state of selecting a node forming the head node of another tree structure, for example, the marks 14b, 14d.

In the case of determining that the hierarchical movement is instructed, a tree structure of another page is displayed in step S112. In display of the tree structure, processing similar to the processing of step S103 to step S105 is performed after a page number to be displayed is recognized. When hierarchical movement is instructed with respect to anode which is not the head of a tree structure (instructions to the effect that hierarchy is descended), a node in which its node is set at the head is displayed. A page number at that time is own page number of its node. When the head node of a tree structure is selected and hierarchical movement is instructed, a tree structure of a page shown by a belong page number of its node is displayed.

With respect to a tree structure of another page, a node can be added and deleted similarly. Also, in the case of creating a new tree structure in which a particular node is set at the head node, the head node is selected and generation of another page is instructed from a menu. Then, a lower node is added to the head node displayed in another page and a tree structure is formed.

Figure 7:
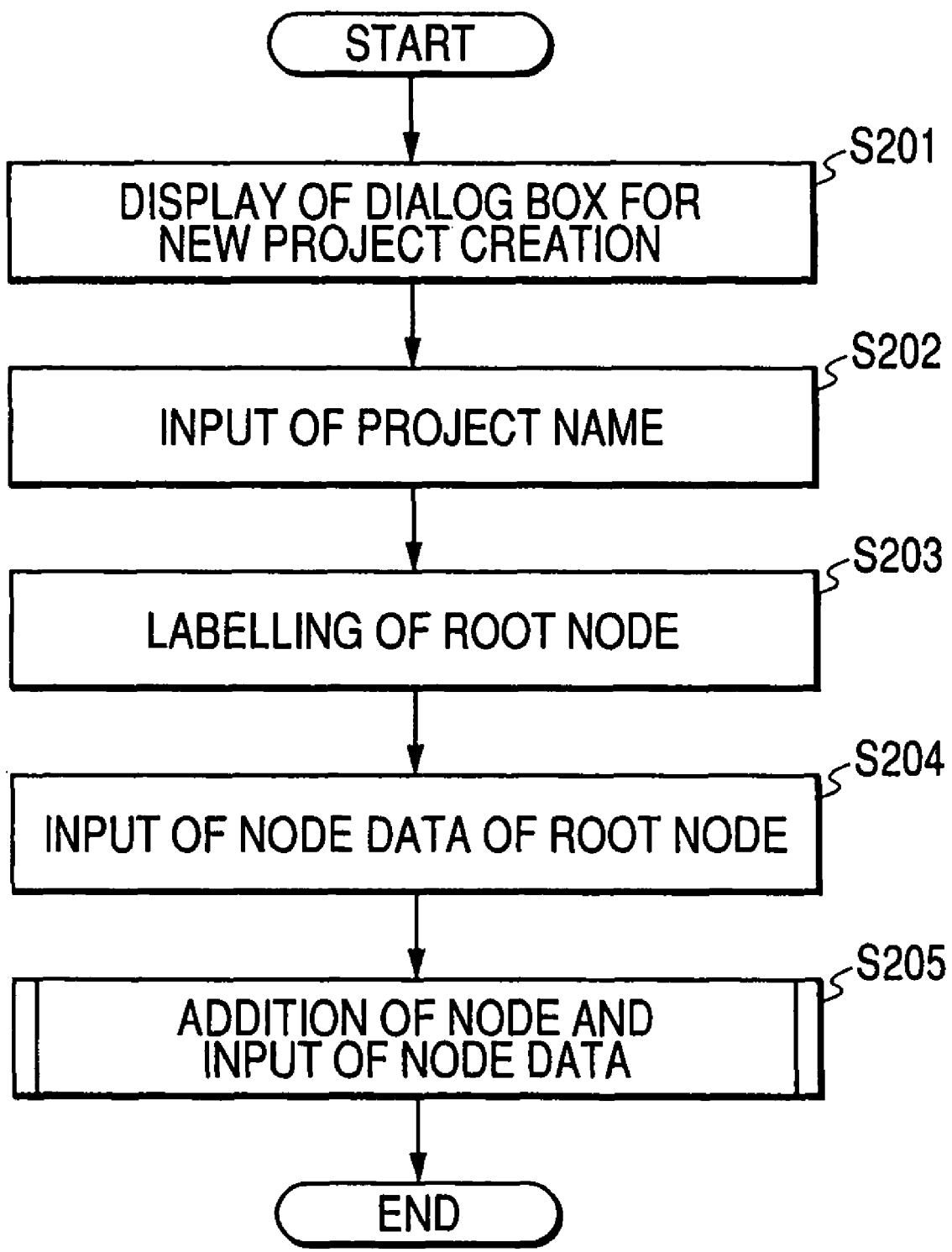
FIG. 7 is a diagram showing a schematic action flow of new project creation in the information management method of the invention.

Next, creation of a new project will be described using FIG. 7. When a project tree (not shown) is displayed and creation of a new project is instructed, a dialog box for new project creation is displayed (step S201). Then, when a project name of at least the new project is inputted through the dialog box (step S202), a root node is labeled on the tree viewer 10 (step S203). Then, node data of the root node is inputted (step S204). Then, a lower node is sequentially added to the root node and node data is inputted (step S205). Input of the node data and addition of the node are performed by a procedure similar to the edit processing described in FIG. 6.

Figure 8:
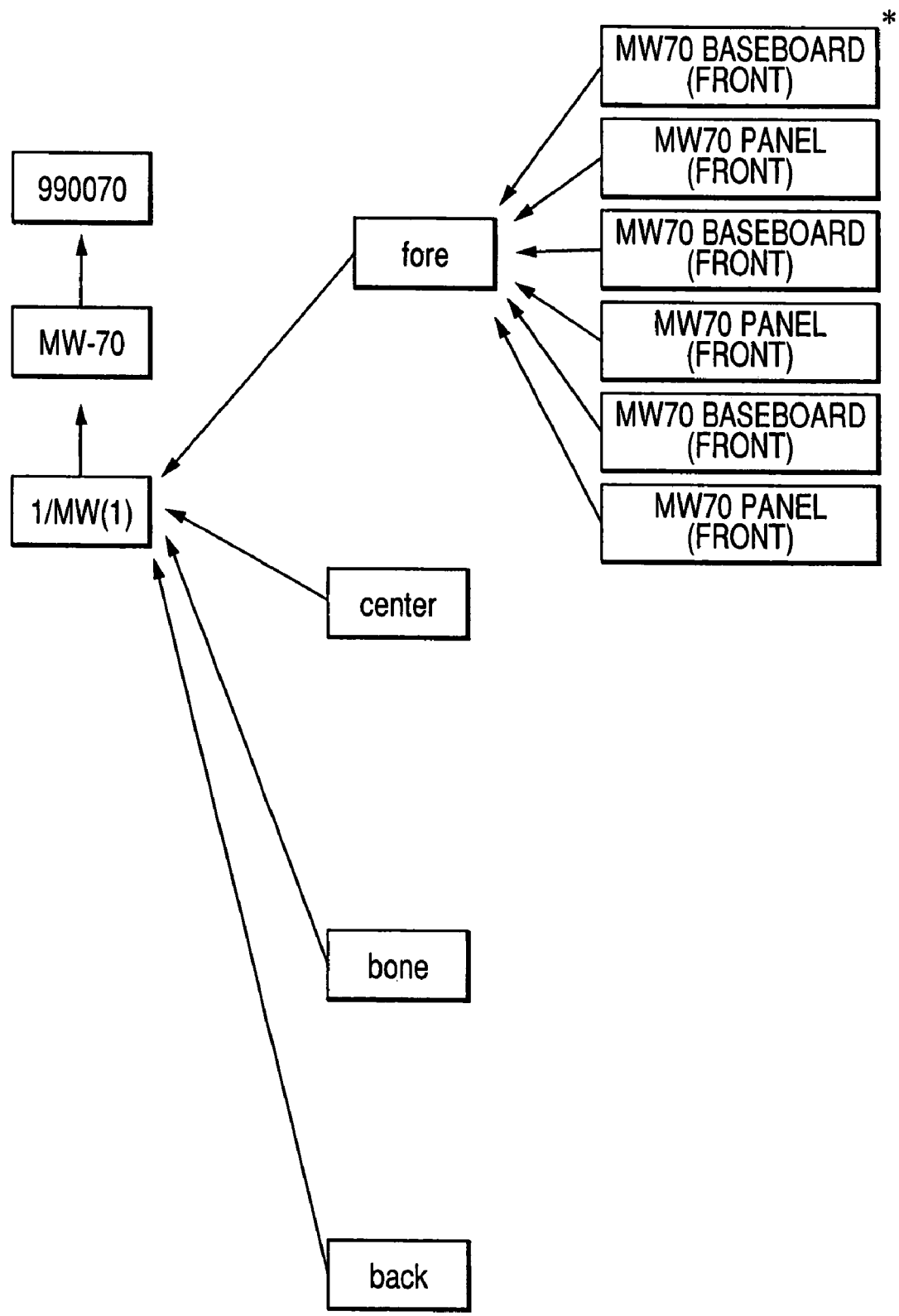
FIG. 8 is a diagram showing one example of a tree structure of the case of being applied to component management of the information management method of the invention.

Subsequently, a script for generation, a script for substitution and variable information included in node data will be described by taking component management as an example. FIG. 8 is a diagram showing one example of a tree structure of the case of being applied to component management. The tree structure of FIG. 8 is a tree structure applied to component management of a product with a product number "990070" and a product name "MW-70", and indicates that the product comprises parts of "fore", "center", "bone" and "back" and each of the parts is further constructed of plural components. However, in FIG. 8, only the component of the part "fore" is described and the other parts are omitted.

As is evident from FIG. 8, the part "fore" is constructed of three "MW70 baseboard (front)" and three "MW70 panel (front)". FIG. 9 shows a portion of node data of a node (to which "*" is assigned in the right corner conveniently in FIG. 8) corresponding to one component "MW70 baseboard (front)", and FIG. 10 shows a display example of the public variable display area 21 of the case of selecting the node, and FIG. 11 shows a display example of the limit variable display area.

A public variable displayed in the public variable display area includes a public variable 51 of self node and a public variable 52 of a lineal upper node, and the public variable 52 of the lineal upper node is displayed by a color different from that of the public variable 51 of self node (shown by changing a font in FIG. 10). Also, the public variables include a public variable to which a fixed value is inputted and a public variable calculated by execution of a script for substitution, and are distinguished by displaying "none" or "need for calculation" in a qualification area.

A value of a public variable of the need for calculation is a blank field until a script for substitution is executed as described below, and FIGS. 9 and 10 show a state before execution of the script for substitution. In addition, when a public variable of the need for calculation is included in a lineal upper node and a value of its public variable is not defined since the substitution script is not executed, its public variable is not displayed in the public variable area 21 of a lower node. That is, reference from other nodes is temporarily stopped.

Figure 12:
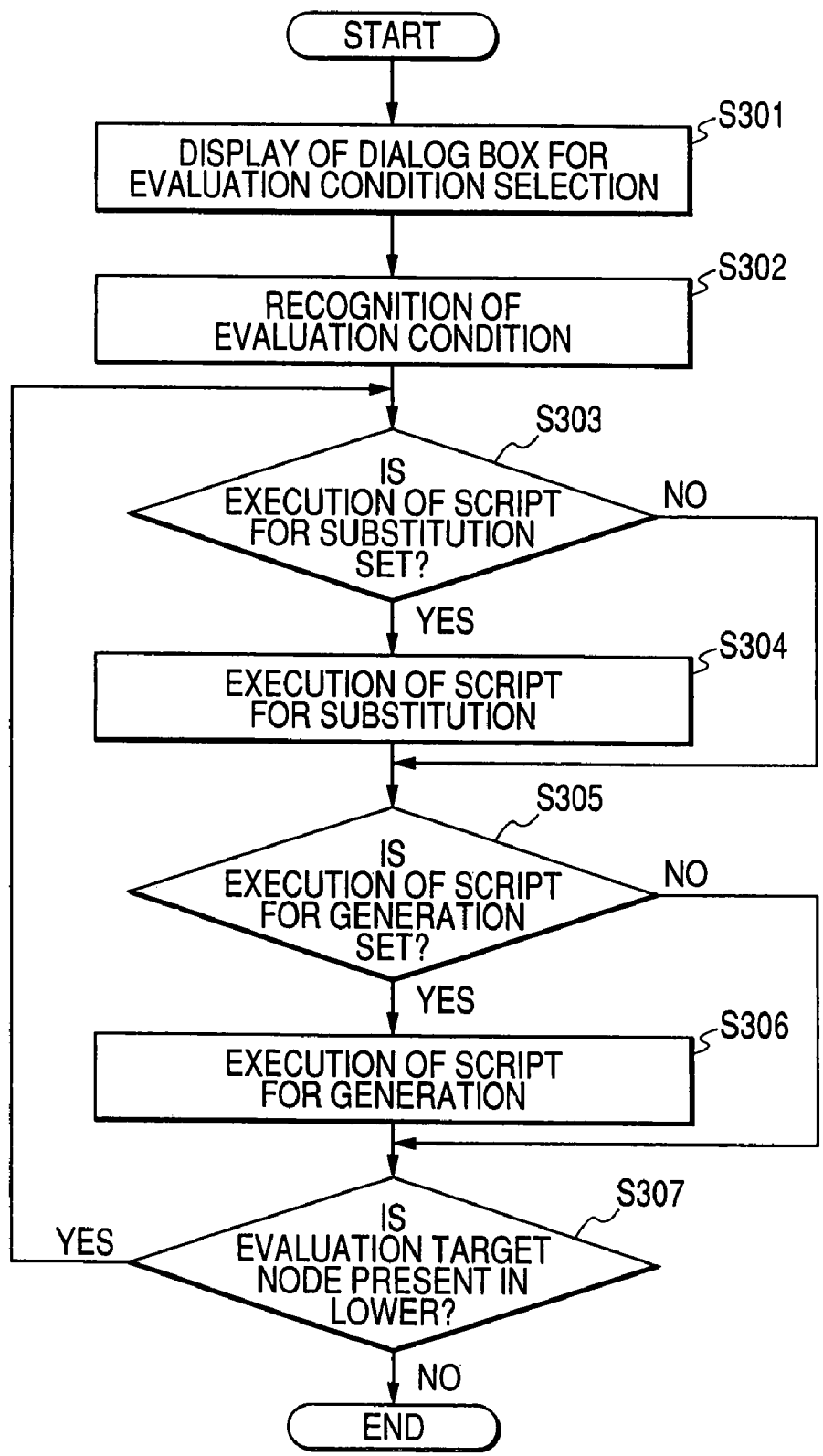
FIG. 12 is a diagram showing a schematic action flow at the time of executing a script in the information management method of the invention.

A script for substitution and a script for generation are executed by pushing an "evaluation" button of the operation button display area 20a. FIG. 12 shows a diagram showing a schematic action flow at the time of executing a script. When a node of a target wishing to execute a script is selected and the "evaluation" button is pushed, a dialog box for evaluation condition setting is displayed (step S301). In this dialog box, at least evaluation hierarchy and a kind of an evaluation target script are enabled. That is, setting of execution of both the scripts, execution of the script for generation, execution of only the script for substitution, and setting as to whether only self node is evaluated or nodes to specified hierarchy of a lineal lower node are evaluated are made.

In step S302, an evaluation condition is recognized according to the contents of setting of the dialog box. Then, it is decided whether or not execution of the script for substitution is set (step S303), and when the execution is set, the script for substitution is executed (step S304).

When the execution of the script for substitution is not set and after the execution of the script for substitution is ended, it is decided whether or not execution of the script for generation is set (step S306). Then, when the execution of the script for generation is set, its script for generation is executed.

When the execution of the script for generation is not set and after the execution of the script for generation is ended, it is decided whether or not an evaluation target node is present in a lineal lower node by referring to node data (step S307). Here, a node generated by execution of the script for generation is also included in a decision target node.

In the case of deciding that a node to execute a script is left in step S307, the flow returns to step S303 and similar decisions on lower nodes are made and the scripts are executed.

Next, a concrete example of the script for substitution and the script for generation will be described using a node to which "*" of FIG. 8 is assigned as a target node. As shown in FIG. 9, the target node has "the number of slices" and "color" as a public variable of the need for calculation, and has "the number of slices=the number of same surfaces" and "color=the number of same surfaces" as the script for substitution. Before evaluation, values of the public variables "the number of slices" and "color" are blank fields as shown in FIG. 10.

When this node is selected in this state and an "evaluation button" is pushed and execution of the script for substitution is set as an evaluation condition, the script for substitution stored is executed. Therefore, a value of the public variable "the number of slices" becomes a value "1" of "the number of same surfaces" which is a public variable of an upper node, and a value of the public variable "color" similarly becomes a value "F-205" of "baseboard color" which is a public variable of an upper node. A display example of the public variable display area 21 of the design table after the execution of the script for substitution is shown in FIG. 13.

Since the target node also has the script for generation, when an "evaluation button" is pushed and execution of the script for generation is set as an evaluation condition, a dictionary node selected by a conditional statement is referred to and a new node is generated. In this example, a dictionary node of a dictionary code "C07000400000000001" is referred to and a node of a node label "baseboard (ST)" is generated.

In this example, the dictionary node of the dictionary code "C07000400000000001" has node data shown in FIG. 14, so that node data of a node newly generated is formed as shown in FIG. 15. In addition, both the node data shown in FIGS. 14 and 15 are partially shown.

As is evident from FIGS. 14 and 15, "baseboard (ST)" which is a "name" of the dictionary node becomes a node label of a node after generation and variable information, a script for substitution, a script for generation, etc. are inherited to a generation node as they are. Since the dictionary node shown in FIG. 14 includes the script for substitution, it is executed after generation. The node data shown in FIG. 15 is data after evaluation.

The node data of the dictionary node shown in FIG. 14 includes a node number and a node display attribute information position, and the node number is rewritten in a node after generation. Also, information about a display position among the node display attribute information may be used as means for indicating a relative position to a display position of a node of a generation source previously or may be generated according to a display position of a node of a generation source at the time of generation.

Figure 16:
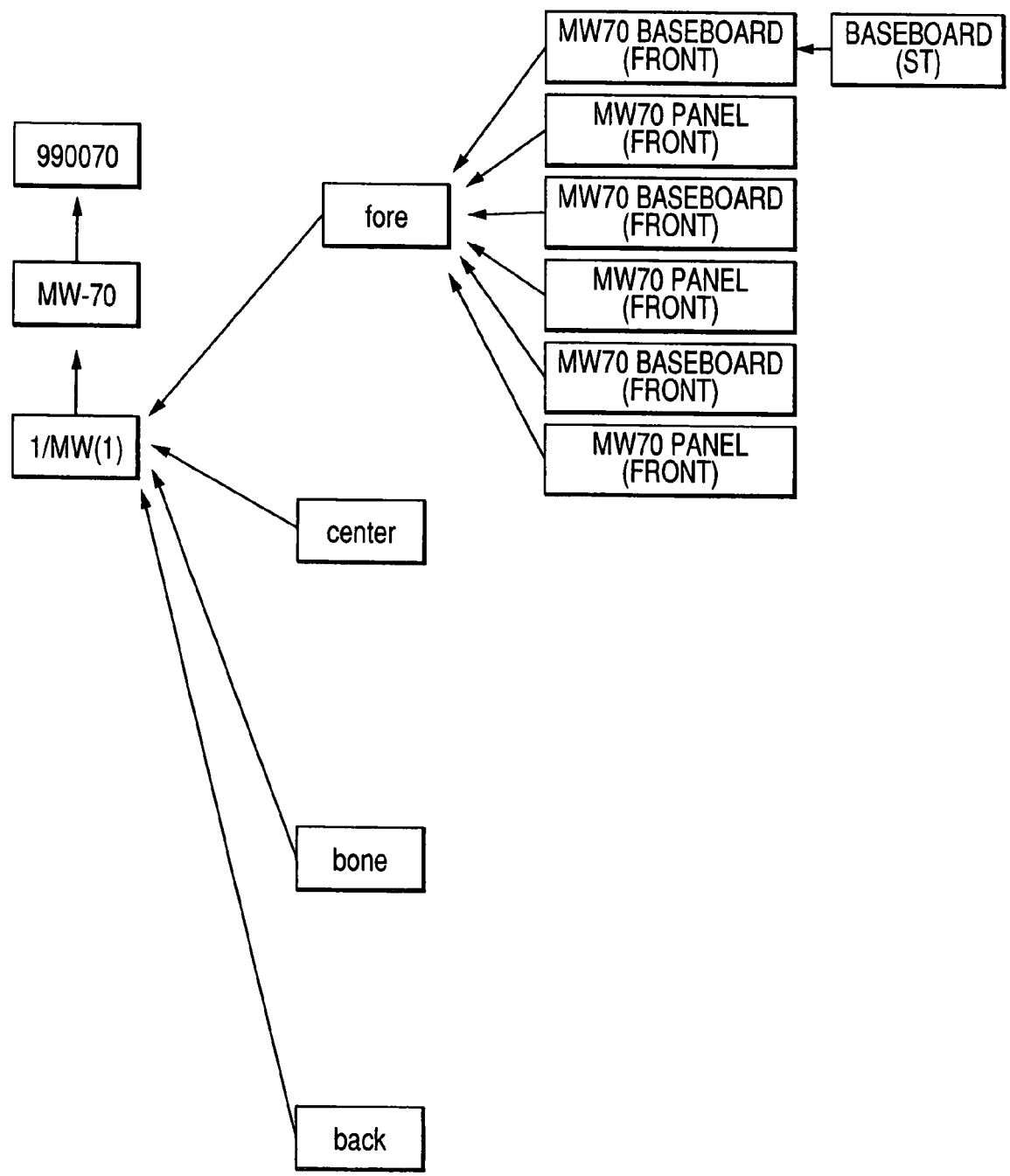
FIG. 16 is a diagram showing a display example after evaluation by a script for generation of a tree structure of the case of being applied to component management of the information management method of the invention.

A display example (partially omitted) of a tree structure after generation displayed on the tree viewer 10 is shown in FIG. 16.

The invention has been described in detail with reference to the particular embodiment, but it is apparent to those skilled in the art that various changes and modifications can be made without departing from the spirit and scope of the invention.

The present application is based on Japanese patent application (application No. 2004-220160) filed on Jul. 28, 2004 and Japanese patent application (application No. 2004-235768) filed on Aug. 13, 2004, and the contents of the patent applications are hereby incorporated by reference.

INDUSTRIAL APPLICABILITY

According to an information management method, an information management program and an information management apparatus of the invention, information to be managed can be updated simply and efficiently.

What is claimed is:

1. An information management method in which a computer manages information, comprising:
responsive to information input, the computer storing information for each of a plurality of nodes in a document file, the nodes including node data with node identification information for identifying the nodes;
responsive to the selection of a node,
identifying a parent node of the node using data included in the node data;
calculating values for node variable data in need of calculation by executing a script for substitution included in the node data, the script for substitution using node data of the node and node data of a lineal upper node of the node; and
displaying a tree structure of the node using node data of the parent node and the node data of the node;
displaying the script for substitution for editing;
responsive to an edit of the script for substitution and selection of a button,
re-calculating values for node variable data in need of calculation by executing the edited script for substitution; and
re-displaying the tree structure of the node;
wherein the document file includes reference information indicating a relation between a reference destination node and a reference source node inputted to the computer, and the script for substitution of the reference source node obtains a value of self node variable data by performing computation using variable data of the reference destination node.

* * * * *